(12) United States Patent
Ratti

(10) Patent No.: US 9,916,755 B1
(45) Date of Patent: Mar. 13, 2018

(54) ON-DEMAND ROADWAY STEWARDSHIP SYSTEM

(71) Applicant: Jayant Ratti, Atlanta, GA (US)

(72) Inventor: Jayant Ratti, Atlanta, GA (US)

(73) Assignee: Jayant Ratti, Atlanta, GA (US)

( * ) Notice: Subject to any disclaimer, the term of this patent is extended or adjusted under 35 U.S.C. 154(b) by 0 days.

(21) Appl. No.: 15/689,350

(22) Filed: Aug. 29, 2017

Related U.S. Application Data

(60) Provisional application No. 62/437,007, filed on Dec. 20, 2016.

(51) Int. Cl.
| | |
|---|---|
| *G08G 1/017* | (2006.01) |
| *G08G 1/054* | (2006.01) |
| *G08G 1/01* | (2006.01) |
| *G06N 99/00* | (2010.01) |
| *G06Q 30/02* | (2012.01) |

(52) U.S. Cl.
CPC ............ *G08G 1/012* (2013.01); *G06N 99/005* (2013.01); *G06Q 30/0207* (2013.01); *G08G 1/0112* (2013.01); *G08G 1/0175* (2013.01)

(58) Field of Classification Search
CPC .............. G01C 21/3602; G01C 21/365; G07C 5/0008; G07C 5/0866; G08G 1/042; G08G 1/052; G08C 17/02; G07B 15/00; G06F 17/00
USPC ....... 340/425.5, 5.25, 937, 928; 701/31.4, 5, 701/32.4, 33.4, 32.6, 19, 1
See application file for complete search history.

(56) References Cited

U.S. PATENT DOCUMENTS

| | | | |
|---|---|---|---|
| 5,948,038 A | 9/1999 | Daly | |
| 6,088,635 A * | 7/2000 | Cox | B61L 23/041 246/115 |
| 6,690,294 B1 * | 2/2004 | Zierden | G08G 1/052 340/933 |
| 6,865,457 B1 * | 3/2005 | Mittelsteadt | G07C 5/008 340/905 |
| 7,941,258 B1 * | 5/2011 | Mittelsteadt | G07C 5/008 340/438 |
| 8,120,513 B2 | 2/2012 | Ioli | |
| 8,510,025 B2 | 8/2013 | Chan | |
| 8,633,815 B2 | 1/2014 | Al-Harbi | |
| 9,137,131 B1 | 9/2015 | Sarukkai | |
| 2002/0186297 A1 | 12/2002 | Bakewell | |
| 2004/0199303 A1 * | 10/2004 | Ohmura | G07B 15/00 701/5 |

(Continued)

FOREIGN PATENT DOCUMENTS

| | | |
|---|---|---|
| CA | 2657284 C | 7/2010 |
| CN | 104952253 | 9/2015 |

(Continued)

*Primary Examiner* — Hoi Lau

(57) ABSTRACT

An on-demand, crowdsourced, roadway stewardship system with video reporting features is disclosed. The invention described herein is comprised of a system that allows users with mobile device cameras to record and report roadway safety incidents, traffic violations, crimes and infrastructure problem. Users are encouraged to become stewards by engaging in the system's rewards program. An on-demand style cloud infrastructure is presented which speeds up video processing and citations. Objects of the invention are to enhance safety and increase public participation in safety.

20 Claims, 15 Drawing Sheets

(56) References Cited

U.S. PATENT DOCUMENTS

| | | | | |
|---|---|---|---|---|
| 2005/0154505 A1* | 7/2005 | Nakamura | ............ | G01C 21/365 701/1 |
| 2005/0171663 A1* | 8/2005 | Mittelsteadt | ............ | G06Q 40/08 701/32.6 |
| 2006/0095175 A1* | 5/2006 | deWaal | ................ | G07C 5/008 701/31.4 |
| 2006/0192658 A1* | 8/2006 | Yamamura | ............ | B60R 25/302 340/425.5 |
| 2008/0111666 A1* | 5/2008 | Plante | .................. | G07C 5/008 340/425.5 |
| 2009/0187300 A1* | 7/2009 | Everitt | ............... | G01C 21/3602 701/31.4 |
| 2010/0111423 A1 | 5/2010 | Balachandran | | |
| 2010/0128127 A1 | 5/2010 | Ciolli | | |
| 2010/0149334 A1 | 6/2010 | Wirsz | | |
| 2010/0245125 A1* | 9/2010 | Wike, Jr. | ............... | G08G 1/042 340/928 |
| 2011/0234749 A1 | 9/2011 | Alon | | |
| 2012/0029764 A1* | 2/2012 | Payne | ................. | G07C 5/0866 701/33.4 |
| 2012/0117195 A1 | 5/2012 | Mattern | | |
| 2012/0307064 A1 | 12/2012 | Schenken | | |
| 2013/0088600 A1 | 4/2013 | Wu | | |
| 2013/0215273 A1 | 8/2013 | Kareev | | |
| 2013/0261880 A1* | 10/2013 | Cho | ........................ | G06F 17/00 701/32.4 |
| 2015/0302735 A1* | 10/2015 | Geerlings | ............... | G08C 17/02 340/5.25 |
| 2015/0363650 A1 | 12/2015 | Braun | | |

FOREIGN PATENT DOCUMENTS

| | | |
|---|---|---|
| CN | CN106297281 A | 1/2017 |
| WO | WO2004111971 A3 | 8/2005 |
| WO | WO2012038964 A3 | 7/2012 |
| WO | WO2013179320 A1 | 12/2013 |
| WO | WO2016207467 A1 | 12/2016 |
| WO | WO2017015297 A1 | 1/2017 |

* cited by examiner

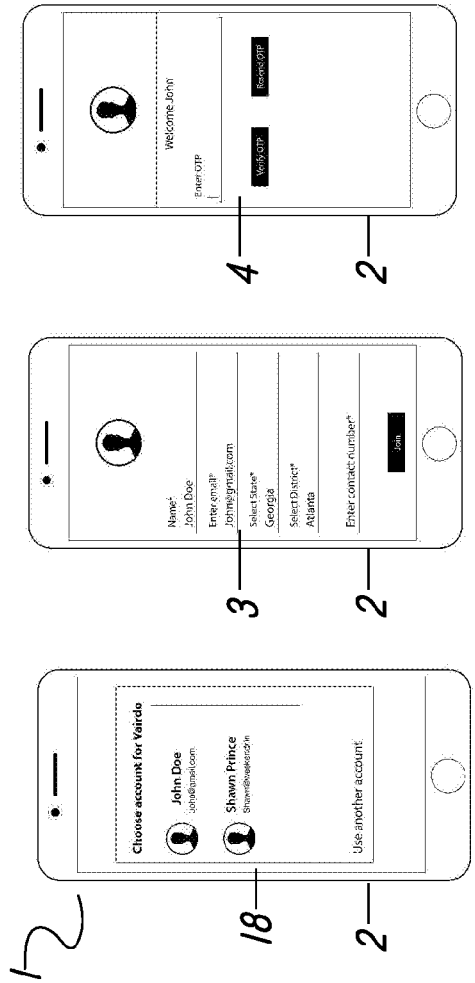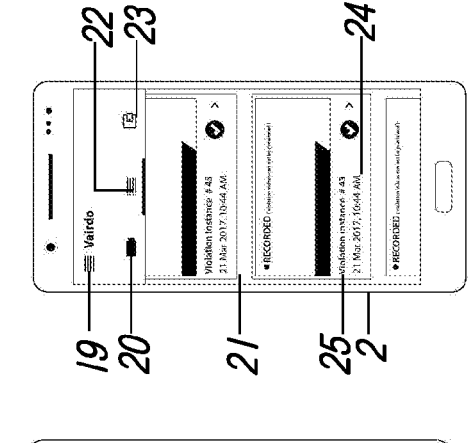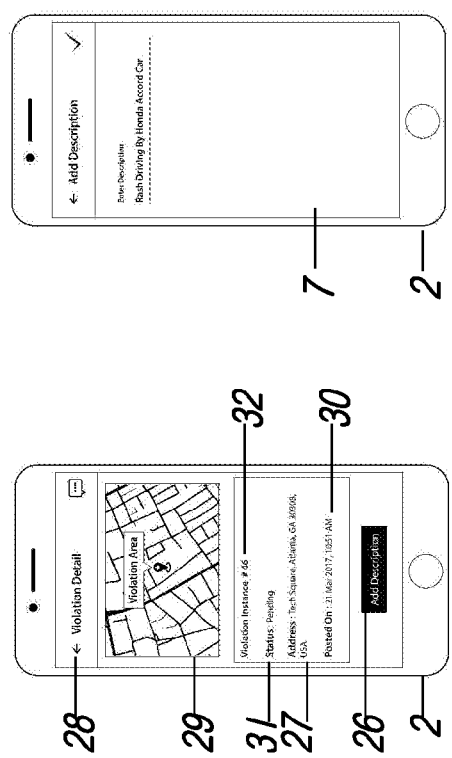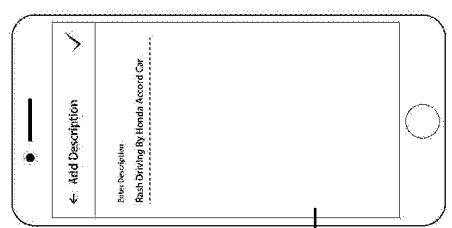

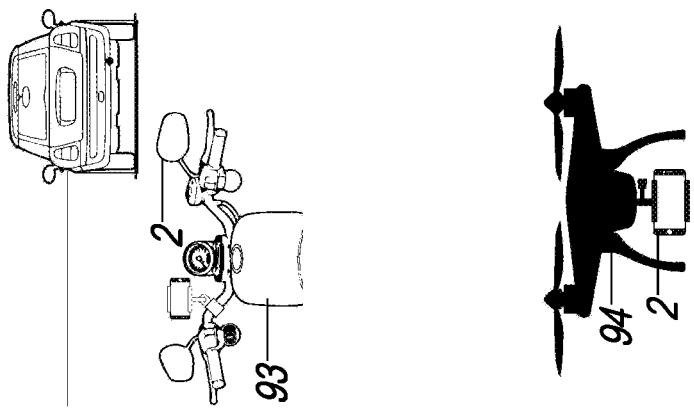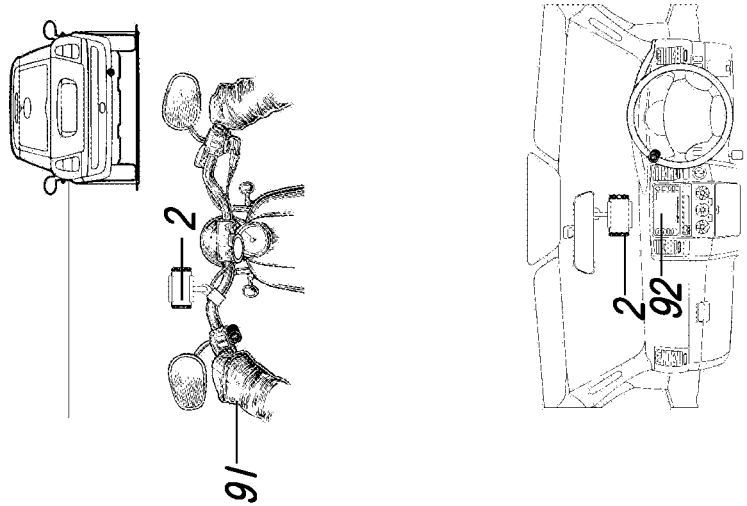
FIG. 19

ON-DEMAND ROADWAY STEWARDSHIP SYSTEM

RELATED APPLICATIONS

This application claims the benefit of U.S. provisional patent application 62/437,007, "Computer Vision based applications using stand-alone cameras, cameras on devices or smartphone/mobile-phone cameras for safety, monitoring, Health & well-being, mobile networking", filed by Jayant Ratti on Dec. 20, 2016. This provisional patent application is incorporated herein by reference.

FIELD OF THE INVENTION

The present invention generally relates to on-demand roadway stewardship. More specifically, this invention relates to a flexible, dynamic and expansive on-demand system that enhances citizen and police participation in roadway monitoring, such as traffic violation identification and deterrence, infrastructure condition reporting, roadway incidents, littering on roads, among others related to roadways, by means of portable/mobile cameras and a cloud based intelligent infrastructure with on-demand AI and personnel to support review of data and forwarding to the respective authorities for prosecution; and such a technology to be useful in other monitoring and reporting applications such as: Shipping Docks, Warehouses, Orchards/Farming, Oil Pipelines, Bridge/construction inspection, Road Condition Monitoring and Driver Alerts, Search & Rescue and many others.

BACKGROUND

Since the advent of modern, engineered roadways in the early 1800s, local, state and federal authorities have continued working on ways to curb roadway violations. As vehicles became faster, traffic signs and traffic signals emerged in the late 1800s. In the mid-1900s police officers began using Doppler radar guns to measure vehicle speeds and deter violators. Today, law enforcement continues to enhance safety by using LIDAR detection, 3D Radar, vehicular cameras as well as body cameras. Many civilians have also begun using dashboard cameras (also called dash cams) in their vehicles to record potential violators in their vicinity for insurance purposes and for accident evidence records. While mobile imaging technology continues to evolve, researchers have begun looking at ways to adapt such technology in an effort to streamline the roadway violation and citation processes.

United States Patent Publication 20150363650A1 filed by Braun teaches a distracted driving system that allows law enforcement officers to send electronic images for real-time citation processing.

United States Patent Publication 20020186297A1 filed by Bakewell teaches a law enforcement van with a plurality of imaging devices allowing for moving violation detection in highway traffic.

United States Patent Publication 20120306640A1 filed by Al-Harbi. et. al. teaches a violation imaging system comprised of a handheld and stationary unit that allows for real-time citation processing.

Canadian patent No. CA2657284(C) granted to Doron teaches a traffic violation imaging system that allows users to mark violations as they occur onto streaming video.

International Patent Publication No. WO 2004111971A3, filed by Higgens, International Patent Publication No. WO 2017015297 filed by Kareev, et al and Chinese Patent Publication CN 106297281A filed by Jian each disclosed stationary traffic violation imaging systems that record violation activity and transmits images to law enforcement.

Chinese Patent Publication No. CN104952253A filed by Qianjin et. al. disclosed a traffic violation imaging system compatible with mobile devices such as smart phones and tablets.

U.S. Pat. No. 5,948,038A granted to Daly et. al. disclosed a traffic violation processing system that attaches identifying information to dash camera footage before storing it in a digital archive.

United States Patent No. 20100111423 granted to Balachandran disclosed a method and system for processing vehicle violations.

U.S. Pat. No. 9,137,131 granted to Sarukkai disclosed a traffic monitoring system that networks traffic monitoring systems over a cloud-based platform.

U.S. Pat. No. 8,510,025 granted to Chan et. al. disclosed a traffic management network using node systems, wherein at least one first node and the at least one second node form a network. The device detection module detects devices associated with Traffic and the central processor processes the information.

2012 Detection of traffic violations US 20120307064 A1 talks about how to determine if violations have occurred using an example of a School Bus and it's stopped position.

2010 Fixed and mobile video traffic enforcement US 20100149334 A1 relates capture and review traffic violations observed by the police officer himself.

2016 Road and public safety control system WO 2016207467 A1 discloses a road and public safety control system which allows traffic to be controlled and alarms to be generated by the police, fire service, rescue services or by citizens, particularly by persons considered potential victims of other individuals 2011 A traffic enforcement system and methods thereof WO 2012038964 A3 talks about a system to defining, monitoring and reporting incidences of potential traffic violations, motion or parking, utilizing at least video clips and offline ticket generation, however doesn't talk about how it would be accomplished.

2012 System for Generating one or more Citation Forms from a Single Workflow US 20120117195 A1

2011 System and method for detecting and recording traffic law violation events US 20110234749 A1 which describes A system for detecting and recording real-time law violations having an array of wide and narrow angled cameras providing a plurality of images of a substantially 360° field of view around a law enforcement unit, 2013 Detection procedure for breaches and violations of rules, laws, regulation detection kit WO 2013179320 A1

2013 Traffic enforcement system and methods thereof US 20130215273 A1 talks about an apparatus for monitoring and reporting suspect traffic violations, which comprises a video camera, a processor and a network interface for reporting the detected traffic violation.

2013 Multi-resolution video analysis and key feature preserving and vehicle tracking, US 20130088600 A1, talks about a video-based analysis system that detects, tracks and archives vehicles in video stream data at multiple resolutions.

2010 Traffic violation detection, recording and evidence processing system US 20100128127 A1

2013 Vehicle identification, tracking and enforcement system U.S. Pat. No. 8,120,513 B2 talks about A system for monitoring and tracking vehicles in parking locations, public roadways and highway entrances and exits and other public vehicle access areas is provided, such as to monitor and track vehicles in parking spaces, public roadways and highways without the need for parking or traffic personnel.

2015 Stop violation detection system and method US 20150084790 A1

While many of the aforementioned systems have started combining video imaging technology with violation detection and real-time citation processing, little in the prior art was found that enhanced public participation in the violation identification and reporting process through the use of publicly available mobile technology, nothing in the prior art talks about streamlining the infrastructure to blend Artificial Intelligence (AI) & Human Intelligence (HI), together termed HAI towards boosting the speed of violation reporting, citation processing and nothing in the prior art directs towards steward rewards program, based on volume of evidence identified, for various persons involved in the stewardship network including the personnel who capture the violation, the video reviewers and the auditors, and other personnel in the stewardship network. Additionally nothing in the prior art talks about the use of an intelligent software system that assigns various Specialists, various tasks for the assessment of incidents captured from the mobile devices.

SUMMARY OF THE INVENTION

The device herein disclosed and described provides a technology solution to the shortcomings in the prior art through the disclosure of an on-demand, fast, multiple-redundancy, roadway steward system with video and/or audio capture and reporting features.

An object of the invention is to innovate a technology for enhancing public participation in roadway safety and enhance police ability to capture & prosecute violators. Due to the limited number of enforcement personnel compared to the number of individuals traveling the roads, any increase in stewardship would have a positive increase in roadway safety; it also allows larger coverage, redundancy of evidence captured for incidents on the roads.

Another object of the aforementioned invention, wherein the mobile device is constantly recording the scene and upon trigger, archives video/pictures for a few seconds or minutes prior to the trigger and post the trigger, the Geo Co-ordinates (using location estimation technologies such as GPS, Cellular networks, Wi-Fi and others) and the time stamp of the incident, along with other data as needed, such as acceleration, and heading, ambient light etc.

Another object of the aforementioned invention is to provide a mobile device software application that allows civilians and law enforcement officials with mobile devices (such as smart phones, tablets, action cameras, drone cameras, body cameras and other camera types) to send multimedia footage (still images and video) of roadway related incidents or conditions, including traffic safety incident reports to law enforcement and insurance providers. Said application supported within the mobile application or on the cloud, may also provide the ability to recognize license plates indicated, automated or manually. Footage would be tagged and forwarded to a cloud storage platform cue. When an interesting event is seen, such as sighting of an unsafe condition, or sighting of a violation is observed, the user simply triggers the capture of the incident to generate video or still image footage covering pre-trigger and post-trigger videos and pictures. Such may also be applied to cases of archeological finds, search and rescue, detailing, monitoring, reconnaissance operations in various fields including railways, shipping, ground transportation, bridge inspections, indoor/outdoor security and more, where the people also trigger capture interesting data and send for processing to the cloud repository of the stewardship network. The triggers may also be automatically generated using fixed time intervals or algorithmically determined when conditions of the algorithm are met by analyzing the incoming data recorded on the mobile device. Another object of the aforementioned invention is to create a database of driving history for drivers on the road by capturing their videos while driving. The said database can provide better assessment for granting said drivers, vehicle insurance, health insurance, life insurance, etc. The database can help local authorities and other vehicles to be vigilant in case drivers with dangerous or unpredictable driving patterns are observed to be driving in the vicinity. The said driving histories of drivers can be used to reward safe drivers and warn dangerous drivers as well.

Another object of the aforementioned invention is to provide traffic stewardship, by providing a means for users to quickly, inconspicuously and safely capture incidents while driving a vehicle or when the vehicle is stationary or on automatic driving mode using simple gestures (hand, finger, facial, vocal etc.) or a remote trigger in conjunction with a mobile device, as shown in FIG. 13 and FIG. 14. A small trigger with Bluetooth (and the like) transmitter is mounted on a steering wheel or motorcycle handlebar or held in the hand of a passenger or other kinds of mounts, as shown in FIG. 17 and FIG. 18. Once an incident is spotted, the user pushes a button on the device or performs a gesture that triggers a recording command to said mobile device.

Another object of the aforementioned invention is to provide a means for users to quickly capture incidents (incidents may include: traffic violations, unsafe road conditions, civil disturbances, dangerous situations, interesting imagery, cellular network coverage/outage areas, among others), using triggers built into the mobile device application. The application utilizes features already available on mobile devices such as cameras, microphones and accelerometers. For example, when an incident is observed, a user then triggers the capture using hand motions (shaking mobile device), voice commands, head movements, specific eye movements, screen taps or swipes, or pressing device buttons FIG. 13, FIG. 14, and the app on said mobile device will record and/or transmit digital footage of the scene, FIG. 15.

Another object of the aforementioned invention is to provide a software application compatible with footage/live-feed from existing stationary video cameras (closed circuit television systems at intersections, IP cameras etc.) as well as cameras mounted on aerial vehicles such as blimps, airplanes and unmanned aerial vehicles. The software application either allows for the pilot or viewer of the footage/live-feed to trigger an incident alert either in real-time (watching the feed) or after the fact, on reviewing the video stock. FIG. 10.

Another object of the invention is to provide speed and efficiency derived from the software that is capable of structuring the citation processing/auditing cell in an on-demand manner similar to how businesses utilize Business Process Outsourcing (BPO) centers/cells which offer Information Technology Enabled Services (ITES), (such as call centers, customer support etc.), which, fields and vets incoming footage from the cloud storage before passing the evidence to respective authorities. In one embodiment focusing on traffic monitoring, a team of traffic safety specialists (which include either or both of humans and Artificially Intelligent Software), which are selected by an Intelligent Software algorithm to examine incoming footage reported by mobile camera user (The mobile camera user can be a human operated camera, or an Artificially Intelligent Software enabled camera that understands and interprets correctness or incorrectness of driving by other vehicles), to affirm and categorize the incident into unsafe conditions or traffic violations etc. Footage is carefully reviewed by intelligent software, which then assigns Artificially Intelligent algorithms and several team members before a final consensus determination is reached and said footage is allowed to be passed on (electronically) to police officials for further citation review or direct transmittal to the violators/authorities for payment/notification, FIG. 15. An example formation of the BPO style model for the traffic violation processing could have several specialists who identify and categorize the traffic violations as seen on the footage captured for cameras on the field. A specialist is by role, either a computer software, or machine or a person who reviews the incoming videos for potential traffic law violators. These specialists can cover one or more of various categories of violations such as: wrong driving, wrong parking, commercial violation, vehicle fitness, among others; as previously mentioned the specialists can be a hybrid mix of humans and Artificially Intelligent Software/Machines. Once the specialists categorize the videos and issue citations, the citations/violations are reviewed by auditors to ensure correctness and fairness. The auditors may themselves be a hybrid mix of software/machines and persons. The admins and supervisors watch over the various specialists and auditors to ensure quality of work. This model can grow in various manners by adding layers of management, staff, artificially intelligent governing software, and operators similar to other well defined BPO models which have been successfully deployed in various industries including call centers, tech support, customer care and more, but with the added advantage of potentially including Artificial Intelligence Agents (Specialists, Auditors etc.) to compliment the activities of persons.

Another object of the invention is the algorithm for allocation of videos to the specialist nodes based on skill sets of the specialists or the categories assigned to the specialists. FIG. 21 shows how an intelligent algorithm assigns the videos to different specialists who are pre-assigned to different violation detection activities; from the goal of getting videos reviewed fastest and making sure the persons and AI nodes are utilized to their maximum capacity. The algorithms can be further optimized to focus on any of the criterion: speed of video review, accuracy of video review (redundancy of video review), and others. FIG. 21 shows one intelligent query algorithm but others can be used to including specialist efficiency, performance and other metrics towards an optimal, accurate and comprehensive review of video evidence data.

Another object of the invention is to provide a means for potential violators to receive citations over their mobile devices, emails, mailing addresses from law enforcement officials. Law enforcement officers would not have to stop potential violators on roads, creating a dangerous situation for both the driver and the officer, or to invest time into handling a single incident, while missing many other potential incidents. In addition, the citation process is streamlined, freeing up the officer's time to tend to more critical roadway safety issues & policing responsibilities.

Another object of the invention is to provide flexibility and expansibility by keeping it on-demand, wherein persons acting as nodes or Artificial Intelligence Nodes can join and leave as pleased, similar to business models for public transportations/taxi such as that in Uber™, Lyft™, Ola™, etc. or Home renting business models, such as that in Airbnb™; or in shopping business models like in Instacart™, among others.

Another object of the invention is to provide incentives for the people involved to become roadway safety stewards; or incentives for programmers/software-developers to build Artificially Intelligent Software (AI) to become roadway safety stewards. Each time a participant submits a safety image or video that is deemed to be an infraction by the Stewardship team, they become eligible for an award, credit, special offer or discount. In some embodiments, said award may be in the form of a commission from the total earnings from the captured violation.

Another object of the invention is to give performance ratings to the stewardship participants; in one embodiment, this model can be used for traffic stewardship, wherein again, in some embodiments the participants can be: A) Camera operators/Violation Reporters B) Specialists identifying/categorizing violations C) Auditors, reviewing citations produced by Specialists. This rating system can be done in many ways which measure: false positives, quantity of violations reported, total operating time and others. In one embodiment, the rating can be as follows:

Rating=(Quantity of Violations−False Positives)/ Total Operating Time

Or other formulas which take into account additional or alternate parameters such as time of day, violation density in a certain area, Clarity of videos recorded, etc.

Another object of the invention is the use of artificially intelligent software to determine traffic laws' violations and read number plates (license plates) of vehicles automatically from various angles, in various lighting conditions and various driving patterns etc. Algorithms can include convolutional neural network[i] (CNN) or Deep Learning Neural Network, kinds of Feed Forward Neural Networks or other kinds of neural networks or more traditional computer vision algorithms utilizing tools like Python, Matlab, TensorFlow™ etc. Traditional ANPR systems have relied on handwritten algorithms for plate localization, normalization, segmentation, character recognition etc. As such these systems tend to be many thousands of lines long. One of the major issues with training neural networks is the requirement for lots of labelled training data. Hundreds of thousands of labelled training images are often required to properly train a network. These algorithms are not limited to just the ones mentioned but can include various types, makes and variants of other Number Plate Recognition algorithms. Such algorithms can be deployed in one, or more, or all of the Mobile Devices, the Computing Servers online, the network layer connecting the mobile devices and the computer servers. In Addition they can also be Artificial intelligence nodes deployed as Specialists in the Stewardship Network. In machine learning, a convolutional neural network (CNN, or ConvNet) is a class of deep, feed-forward artificial neural networks that has successfully been applied to analyzing visual imagery. CNNs use a variation of multilayer perceptrons designed to require minimal preprocessing. They are also known as shift invariant or space invariant artificial neural networks (SIANN), based on their shared-weights architecture and translation invariance characteristics. Convolutional networks were inspired by biological processes in which the connectivity pattern between neurons is inspired by the organization of the animal visual cortex. Individual cortical neurons respond to stimuli only in a restricted region of the visual field known as the receptive field. The receptive fields of different neurons partially overlap such that they cover the entire visual field. CNNs use relatively little pre-processing compared to other image classification algorithms. This means that the network learns the filters that in traditional algorithms were hand-engineered. This independence from prior knowledge and human effort in feature design is a major advantage. They have applications in image and video recognition, recommender systems and natural language processing. A CNN consists of an input and an output layer, as well as multiple hidden layers. The hidden layers are either convolutional, pooling or fully connected. Fully connected layers connect every neuron in one layer to every neuron in another layer. It is in principle the same as the traditional multi-layer perceptron neural network (MLP). Some time-delay neural networks use a similar architecture, especially those for image recognition or classification tasks Another object of the invention is the use of crowdsourcing and crowdfunding models in the execution of the system. Crowdsourcing is defined as the practice of obtaining information or input into a task or project by enlisting the services of a large number of people, either paid or unpaid, typically via the Internet. Crowdfunding is the practice of funding a project or venture by raising money from a large number of people who each contribute a relatively small amount, typically via the Internet. Wherein the crowdsourcing is done to avail services to capture violations and crowdfunding is done through the violators paying their citations.

It is briefly noted that upon reading this disclosure, those skilled in the art will recognize various means for carrying out these intended features of the invention. As such it is to be understood that other methods, applications and systems adapted to the task may be configured to carry out these features and are therefore considered to be within the scope and intent of the present invention, and are anticipated. With respect to the above description, before explaining at least one preferred embodiment of the herein disclosed invention in detail, it is to be understood that the invention is not limited in its application to the details of construction and to the arrangement of the components in the following description or illustrated in the drawings. The invention herein described is capable of other embodiments and of being practiced and carried out in various ways which will be obvious to those skilled in the art. Also, it is to be understood that the phraseology and terminology employed herein are for the purpose of description and should not be regarded as limiting.

As such, those skilled in the art will appreciate that the conception upon which this disclosure is based may readily be utilized as a basis for designing of other structures, methods and systems for carrying out the several purposes of the present disclosed device.

The objects features, and advantages of the present invention, as well as the advantages thereof over existing prior art, which will become apparent from the description to follow, are accomplished by the improvements described in this specification and hereinafter described in the following detailed description which fully discloses the invention, but should not be considered as placing limitations thereon.

BRIEF DESCRIPTION OF THE FIGURES

The accompanying drawings, which are incorporated herein and form a part of the specification, illustrate some, but not the only or exclusive, examples of embodiments and/or features. It is intended that the embodiments and figures disclosed herein are to be considered illustrative rather than limiting. In the drawings:

FIG. 1 showing an account screen of the user's application on a cell phone showing the profile of the person using the application.

FIG. 2 showing a configuration screen of the user's application on a cell phone, showing the location details and contact details of the user of the smartphone application FIG. 3 showing a front view of the user's application on a cell phone, where the security code is entered by the user to confirm the mobile device belongs to them.

FIG. 4 showing a front view of the user's application on a cell phone showing various incidents recorded by the user.

FIG. 5 showing a front view of the user's application on a cell phone showing the Map location of the incident and the address.

FIG. 6 showing a front view of the user's application on a cell phone showing a place for a person to add more details to an incident.

FIG. 7 showing a front view of the user's application on a cell phone showing the login screen of the application.

FIG. 19 showing perspective views of the invention on various mountings.

Figure 8:
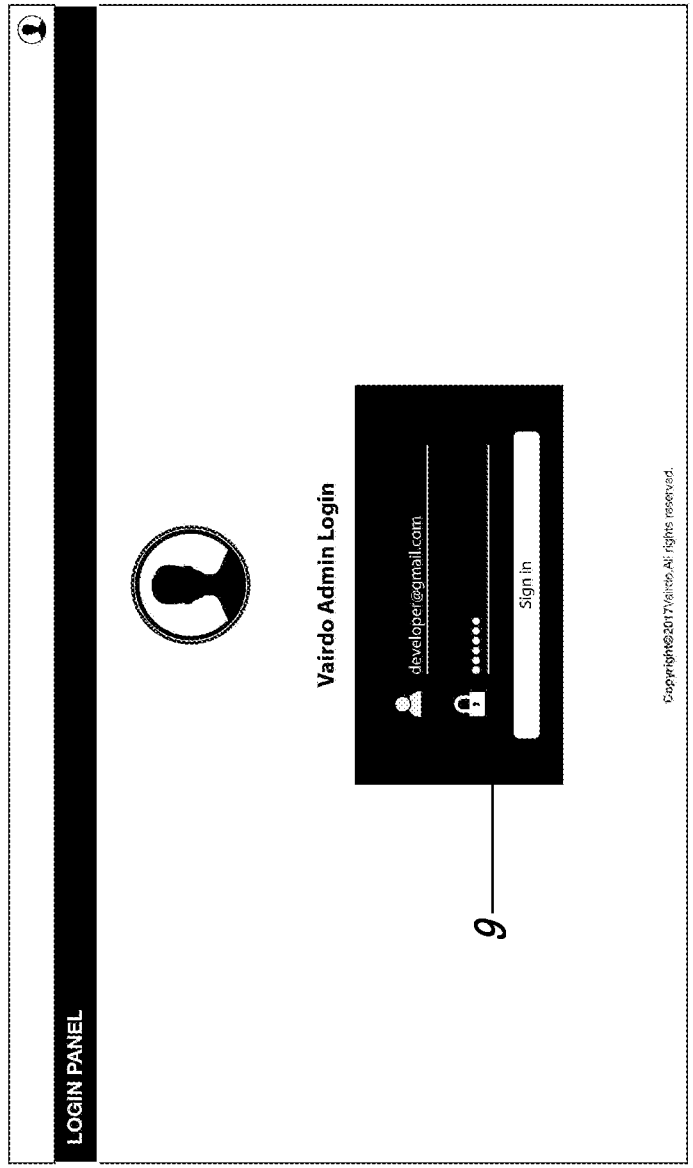
FIG. 8 showing a front view of the on-demand style center application on a computer screen where in the login details are entered such as username and password.

Other aspects of the present invention shall be more readily understood when considered in conjunction with the accompanying drawings, and the following detailed description, neither of which should be considered limiting.

DETAILED DESCRIPTION OF FIGURES

In our day and age, we are seeing an explosion in the number of automobiles on the roads globally. Road accidents and traffic violations are not curbed due to limited monitoring by Police Departments and Automated Cameras (Red Light/Speed monitoring), both are hugely expensive and burdensome, multiple kinds of violations go un-noticed, un-regulated, accidents are bountiful. Police officers are limited, and traffic on our roads is very dense, so proper and effective monitoring is not possible 24 hours a day, 7 days a week, and 365 days a year in all weather conditions, events, functions, road conditions, budget cuts for police and many more limitations. The solution lies in equipping personal/private/government vehicles with state of the art cameras and monitoring solutions which will capture violations on the road (red light jumping, driving without helmets, stop line jumping, lane departure without indicator, over-speeding, and including all traffic violations captured visually by police and automated cameras to date. In case of armed/hostile takeover of car, the cameras can capture the inside of cars; all cameras need essentially some memory storage, GPS, user data input, 4G/Wi-Fi connection and a cloud base data storage and recovery feature.

One very effective way to tackle this challenge is to engage existing roadway businesses and establishments such as state police, ambulances, postal departments, public busses and private agencies such as Uber™, UPS™, Averett™ Trucking, Xerox™, and other similar agencies/corporations which use the roadways to conduct their businesses. A very effective way to utilize the roadways and allow these agencies and even citizens to deploy cameras for capturing roadway events/incidents, is to enable all participants to earn rewards (monetary or non-monetary) in lieu of their service in gathering event/incident data in the form of videos/pictures and submitting them to the cloud central hub for processing. The model that has most adaptively and expansively been adopted in other business is called the on-demand business model. Wherein participants can join or leave as they desire and provide services, get rewarded and contribute to the societies' well-being. On demand companies exist and some are: Uber Airbnb, and Instacart among others. On-demand business model has giving rise to a unique economic framework called the "on-demand economy". On-demand business models are powerful because they are catering to the changes in customer behavior; Millennials and Gen-C have an appetite for greater convenience, speed, and simplicity that an on-demand business model takes care of perfectly, especially when combined with an excellent app which has great user experience. More specifically, it is a business model in which you fulfill customer demand via the immediate provisioning of goods and services.

This invention presents an on-demand business model which utilizes aspects of monitoring and processing wherein both the monitoring and processing is carried out on-demand, through the use of mobile cameras, a cloud repository for video transmittal/storage, and a BPO style ITES equipped backend infrastructure which utilizes personnel which are also on-demand.

The infrastructure at a minimum can be divided into two parts:

One part is comprised of the data collectors (such as people, police, IP cameras, A.I. enabled cameras etc.), and the other part are the data processors (people, automated/intelligent data processing etc.).

Figure 14:
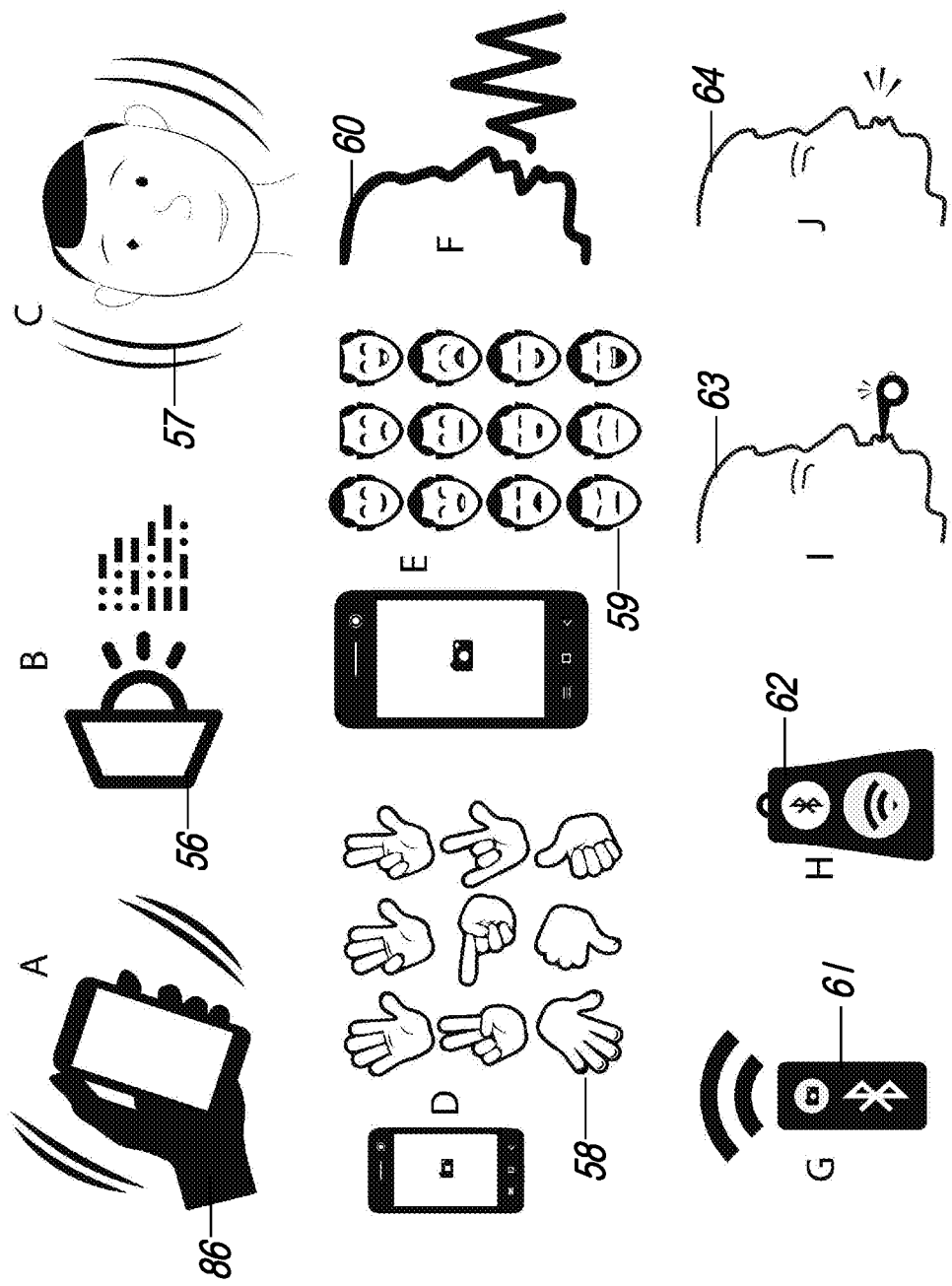
FIG. 14 shows various ways of capturing videos or triggering a violation capture on a camera/video-recording device.

One embodiment of the said infrastructure utilizes people wearing body-worn cameras, or flying cameras, cameras on drones, dashboard/windshield mounted cameras and other forms of cameras; and the users either manually determine an incident on the road (such as a traffic violation) and trigger the capture of the incident using various methods as pressing a button, double tapping a phone screen, drawing patterns on a touch screen, whistling etc. as covered in FIG. 14. The cameras may also be automated, wherein the application/software residing on the cameras automatically determines some incidents, such as over-speeding of visible vehicles beyond the speed limit imposed by the state, or crossing double white lines on the road, among others. The act of capturing can be completely manual, automated or a hybrid of the two. The captured evidence/video is transmitted or copied to the cloud based repository for processing, wherein the portal assigns various operatives the task of reviewing, categorizing, citing the incidents. For example: a video may have a vehicle jumping a red-light and also another vehicle throwing trash on the road, among other violations. The specialists working in the framework, which are artificially intelligent software or humans or a hybrid mix of humans and A.I. software, will assess and categorize the incidents in the videos and save the report on the cloud. Another set of operatives are called auditors (who can also be artificially intelligent software or humans or a hybrid mix of humans and A.I. software), who review the work by the specialists to make sure the review was done accurately. Both are given points based on their efficiency, accuracy, speed and performance of reviews. The infrastructure can have many different personnel or artificially intelligent agents, with various designations and roles, however, there needs to be at least one type of operator which can review and video data being sent to the cloud repository. After the review is completed and the incident categorized, the report/citation is forwarded to the respected civic, private, government authorities for prosecution or other actions.

In this description, the directional prepositions of up, upwardly, down, downwardly, front, back, top, upper, bottom, lower, left, right and other such terms refer to the device as it is oriented and appears in the drawings and are used for convenience only; they are not intended to be limiting or to imply that the device has to be used or positioned in any particular orientation.

FIG. 1 showing a front view of one embodiment of the aforementioned invention's user application 18 on cell phone 2 having an account creation screen. Said application for users also being configured for a plurality of mobile and desktop devices such as tablets, laptops, personal computers and the like. Said application 1 also being scripted in a common software language such as, but not limited to C programming, Java and the like. Said user comprised of a public citizen, or law enforcement official etc.

FIG. 2 showing a front view of one embodiment of the aforementioned invention's user application 1 on a cell phone 2 having a registration screen 3 allowing users to input a user profile.

FIG. 3 showing a front view of one embodiment, of the aforementioned invention's user application 1 on a cell phone 2 having a password creation screen 4 allowing users to set a personal login password and an identify/security check wherein the user is prompted to enter a verification password sent to their cellular phone.

FIG. 4 showing a front view of one embodiment, of the aforementioned invention's user application 1 on a cell phone 2 having a safety event screen 21. Said screen allowing users to record a 'violation instance' 21 using said phone 2's onboard camera. The screen also having video recording panel 20 and earnings report and score 23. The video recording panel is basically a view of the scene on the phone's display as viewed from the camera. The violation instances 21 having an identification number 25 and a date and time stamp 24. The safety event screen 21 also having 'hamburg' 19 allowing users to scan through other screens.

FIG. 5 showing a front view of one embodiment, of the aforementioned invention's user application 1 on a cell phone 2 having a violation location screen 28. Said screen 28 displaying the location of said violation instances 29 on map 29 along with address 27, violation instance identification number 32 and time and date 30. The location and mapping function may utilize an existing mobile device mapping application such as Google Maps and the like. The screen 28 having an 'add description' 26 allowing users to enter descriptive information using the mobile device 1's keyboard function. However, during active mode, the 'add description' 26 is not required, and is optional, which may be done after the user goes offline.

FIG. 6 showing a front view of one embodiment, of the aforementioned invention's user application 1 on a cell phone 2 having said add description button 26 displaying a text pad screen 7 to record descriptions thereon.

FIG. 7 showing a front view of one embodiment, of the aforementioned invention's user application 1 on a cell phone 2 having a save screen with logo 8 and login button 33.

FIG. 8 shows front view of the on-demand, BPO center application on a computer screen 14 having login screen 9 with username and password features for stewardship Specialist/personnel thereon.

Figure 9:
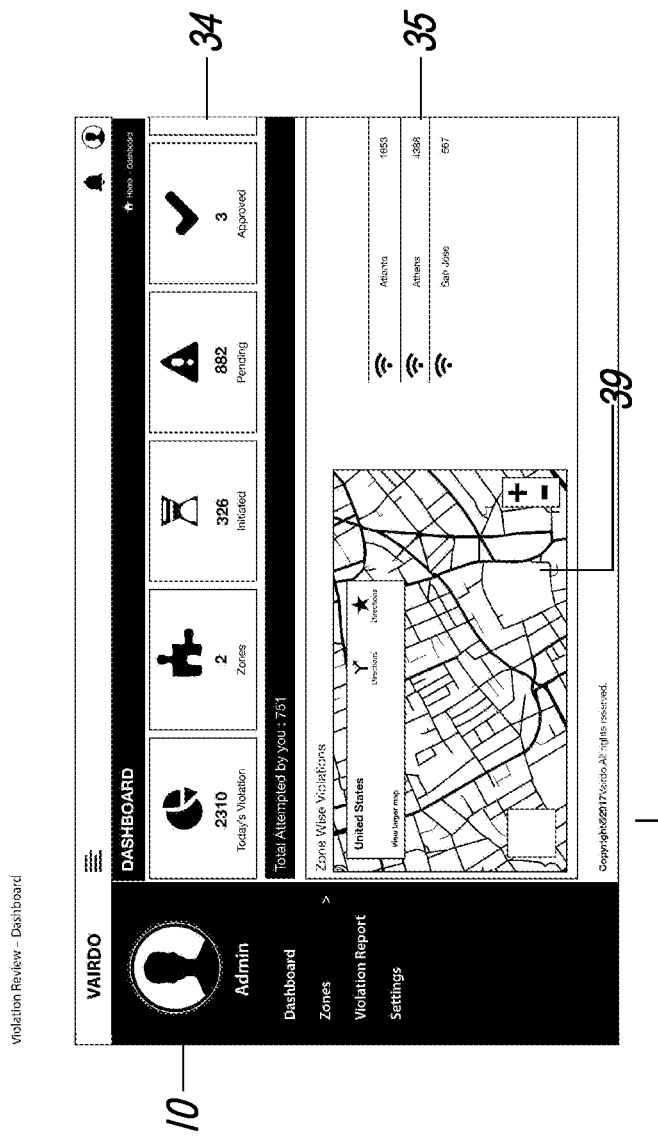
FIG. 9 showing a front view of the on-demand style center application on a computer screen, wherein the location of the violation is being shown.

FIG. 9 showing front view of the on-demand BPO center application on a computer screen 14 having dashboard with zone map 39 depicting violation instance location that was recorded by a user. Said zone map 39 also having location statistics 35 and total violations summary panel 34 allowing call center personnel to understand instance location.

Figure 10:
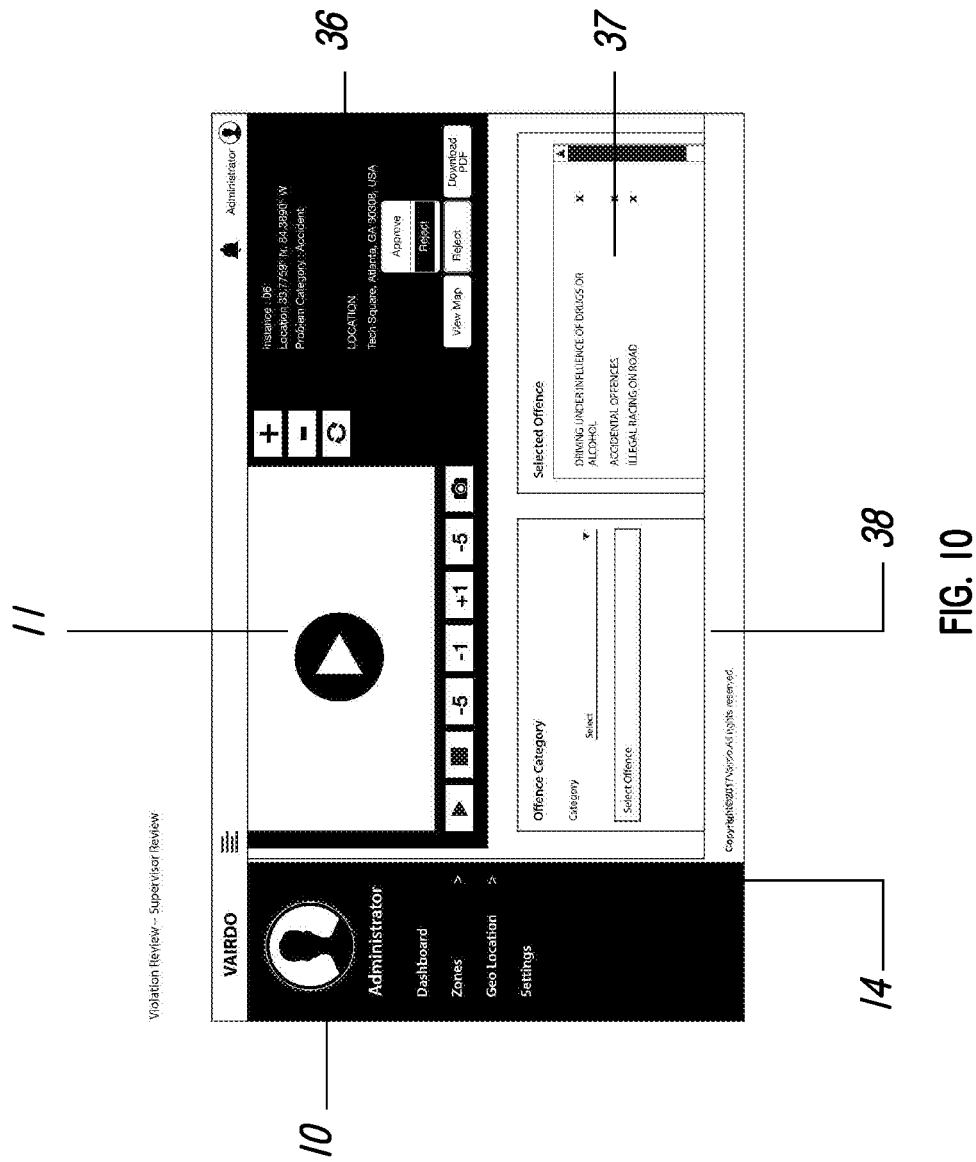
FIG. 10 showing a front view of the on-demand style center application on a computer screen, where the video being streamed or footage of the video is shown to the operator on that computer terminal.

FIG. 10 showing front view of the on-demand BPO center application on a computer screen 14 having Offence Category 38. Selected Offence 38 having radio button selection options such as, but not limited to, driving under the influence, accidental offences and illegal racing on road and the like. Said offence category 38 having user violation instance log 36 with video review 11 as well as map preview and rejection options allowing on-demand personnel to preview violation instances sent in by users.

Figure 11:
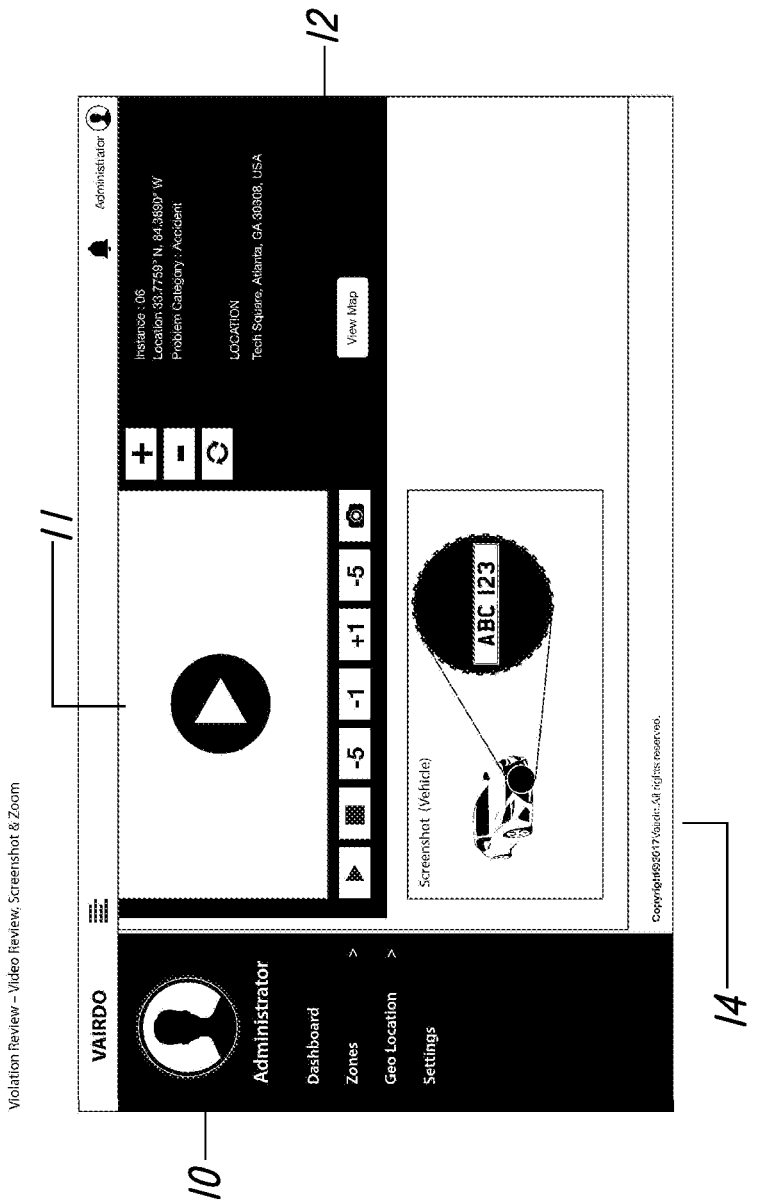
FIG. 11 showing a front view of the on-demand style center application on a computer screen, wherein the license plate of the vehicle is being manually or automatically extracted from the video.

FIG. 11 showing front view of the on-demand BPO center application on a computer screen 14 having license plate recognition preview window 12 allowing on-demand personnel to identify potential violators recorded by users on the field. The license plate can be manually entered or automatically determined by the use of computer vision algorithms.

Figure 12:
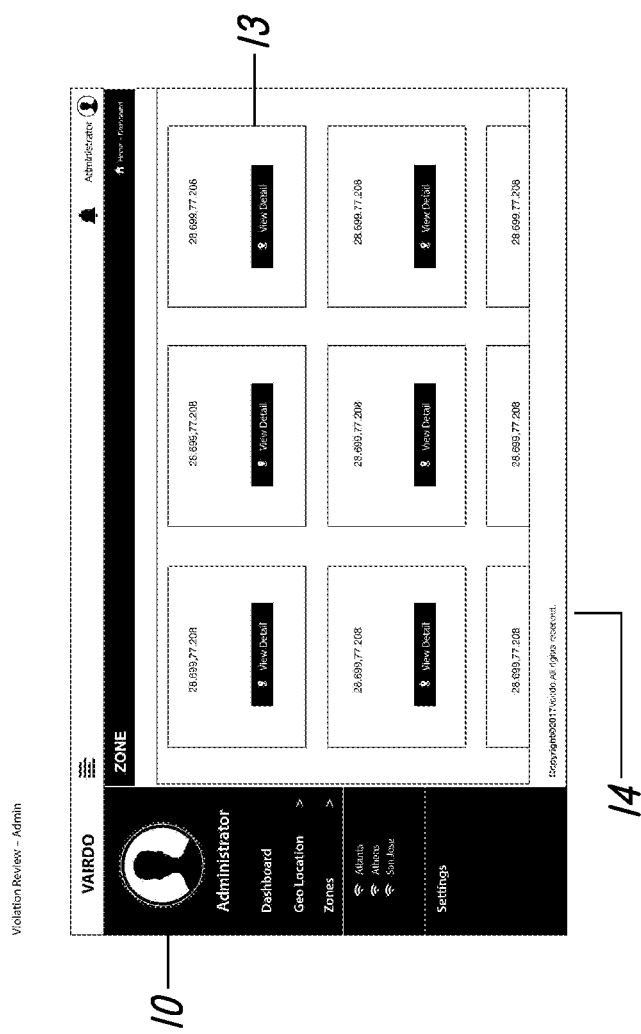
FIG. 12 showing a front view of the on-demand style center application on a computer screen with various violation instances being shown.

FIG. 12 showing front view of the on-demand BPO center application on a computer screen 14 having a violation instance directory 13 listing icons of said instances allowing on-demand operatives to organize said data.

Figure 13:
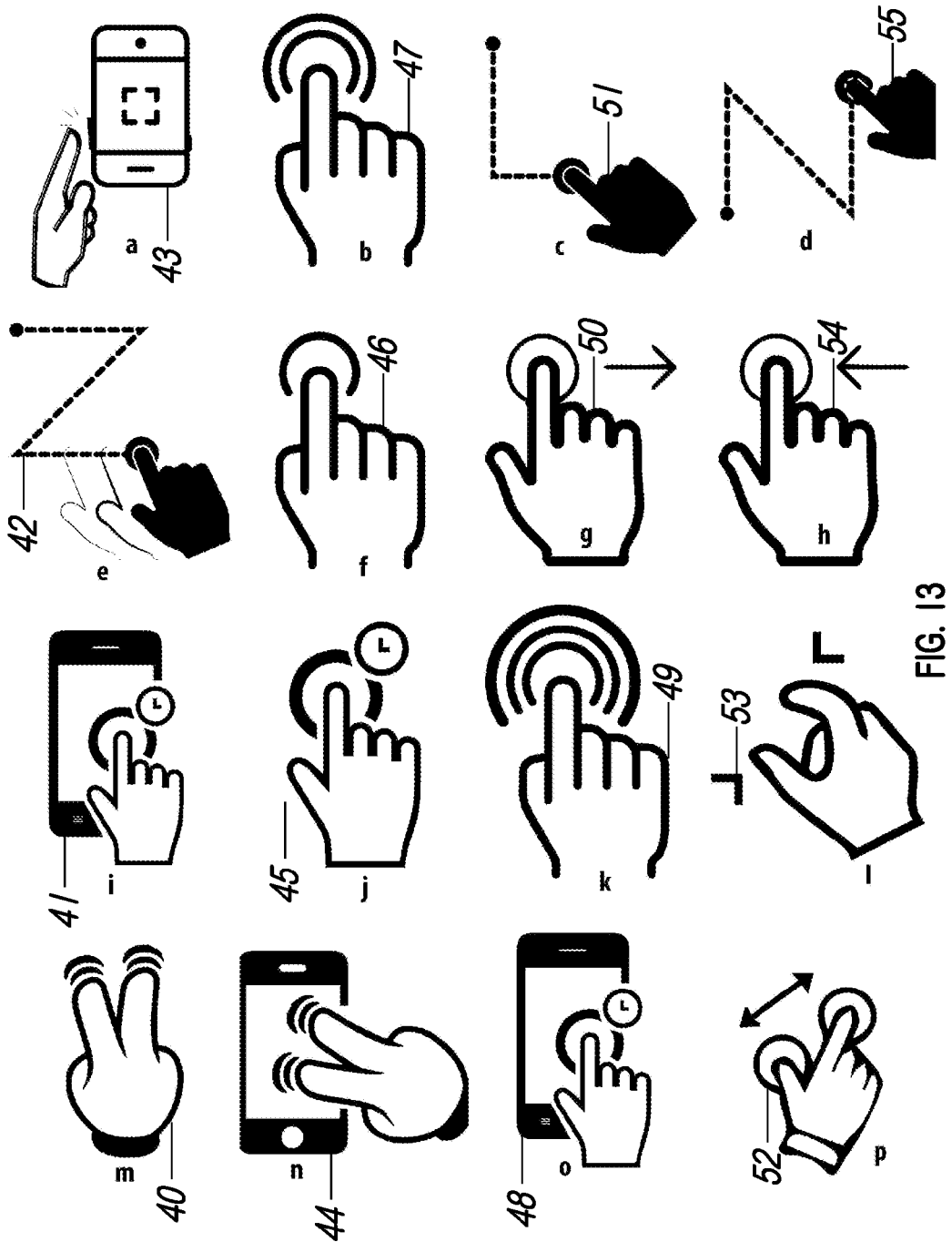
FIG. 13 shows various ways of capturing videos or triggering a violation capture on a mobile phone.

FIG. 13 showing front view of the software application violation instance triggers. Embodiments of said triggers including, but not limited to, two finger screen swipe 40, single finger screen tap 41, single finger preset N pattern 42, button tap 43, two finger tap 44, single screen tap withhold 45, single finger screen tap 46, single finger with double screen tap 47, single finger screen tap withhold 48, single finger with triple screen taps 49, single finger screen tap 50, single finger preset L pattern 51, dual finger expansion swipe 52, dual finger pinch swipe 53, single finger screen tap 54 or single finger preset Z pattern 55.

FIG. 14 showing front view of the software application violation instance triggers comprised of a shaking motion of a mobile device 86 interacting with an onboard accelerometer, a sequence of noises 56 that interact with a mobile device microphone, a multitude of head motions 57 recognized by a mobile device camera, a plurality of hand gestures 58 being recognized by a mobile device camera and being converted into a trigger command; a plurality of facial gestures 59 being recognized by a mobile device camera and being converted into a trigger command; a preset voice command 60 being recognized by a mobile device camera and being converted into a trigger command; a manual clicker button 61 sending a Bluetooth command trigger and being recognized by a mobile device camera and being converted into a trigger command; a key chain clicker 62 sending a Bluetooth command trigger and being recognized by a mobile device camera and being converted into a trigger command; a traffic whistle 63 being recognized by a mobile device microphone and being interpreted as a recording trigger, a human whistle 64 being recognized by a mobile device microphone and being interpreted as a recording trigger.

Figure 15:
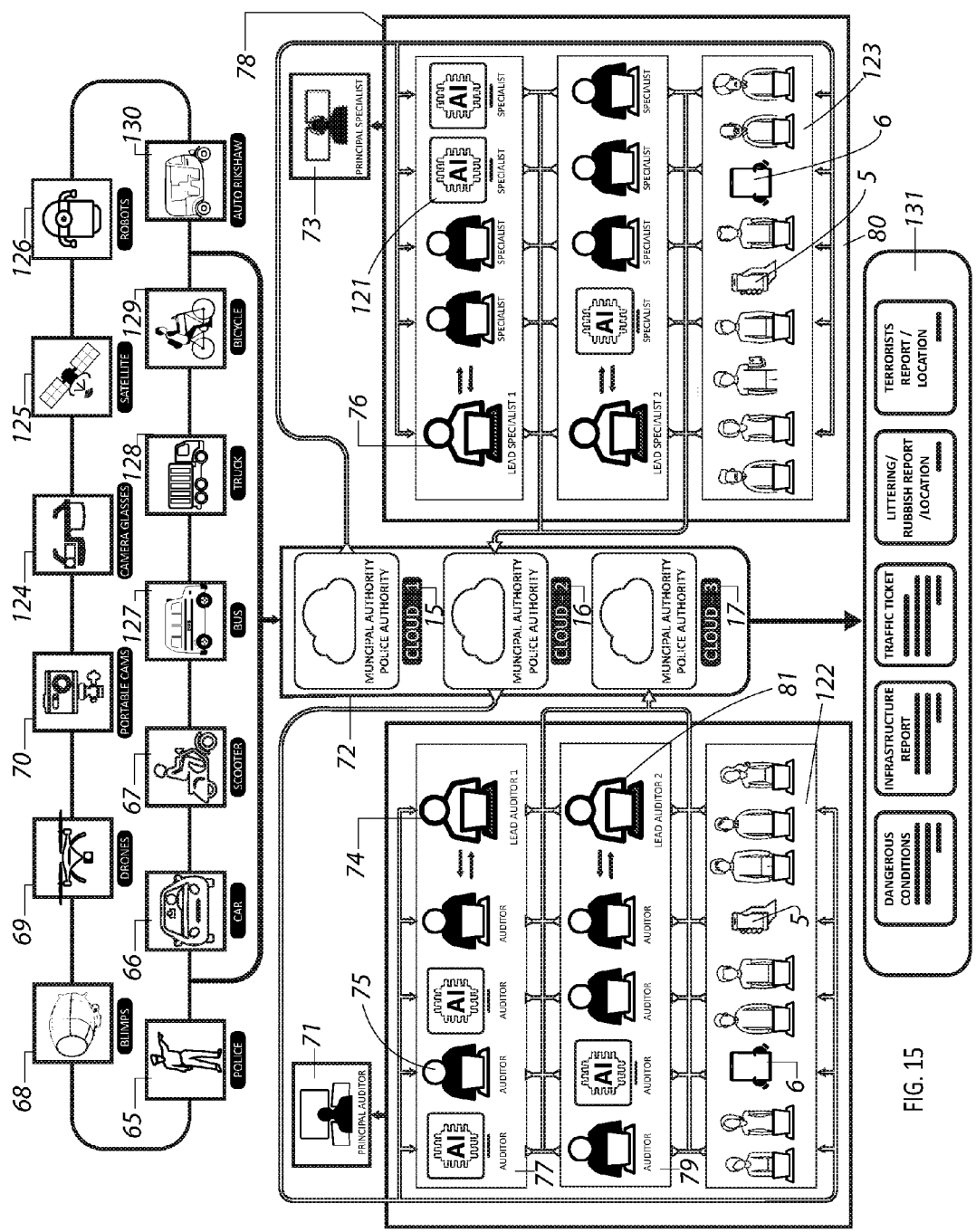
FIG. 15 showing one embodiment of an on-demand model where personnel have different functions.

FIG. 15 showing a flow diagram of the aforementioned invention illustrating general functions. First, a plurality of violation instances (such as, but not limited to speeding, failing to stop, dilapidated bridges etc.) being captured and recorded by a user with a recording device having a camera by a user such as a police officer 65, a driver of a car 66, a 2-wheeler driver 67, bus driver 127, truck driver 128, bicycle rider 129, auto-rickshaw driver 130 among others or indirectly through a blimp pilot 68, a drone operator 69 or even various kinds of IP or portable cameras 70, camera glasses 124, satellite 125, or a robot 126, being transmitted to a cloud network, cloud-1, 72, 15, by means of a Wi-Fi signal, cell tower infrastructure network (through 5G/4G/3G/2G/G/Edge etc. connections) and the like. Second, said potential violation instances being downloaded from the cloud-1, 15, by said call center specialists 78 at centralized location using networked computers, mobile phones 5, tablets 6 etc., and non-centralized locations by non-centralized specialists 80, 123, using networked computers 123, mobiles phones 5, tablets 6 etc. and reviewed for violation determinations. The review from Specialists being uploaded to Cloud-2, 16 and being retrieved by Auditors from same cloud. Third, said incident violation being monitored for soundness and accuracy within local laws by trained Auditors 75, 77, 79, connected to the network, either centralized or distributed respectively, and then uploaded to Cloud-3, 17 for further prosecution or processing by other agencies; the said specialists and auditors also Artificial Intelligence Algorithms 121, 77 which can also take in the place of Specialists and Auditors or vice-versa. Lead Specialists 76 and Lead Auditors 74 maintain a group of Specialists and Auditors respectively for quality control, training, reviewing and more, with the Principal Specialists, Principal Auditors 73 and 71 respectively being dedicated to a group of Lead Specialists and Lead Auditors respectively. Such organizational structure being flexible. Fourth, said incident violation being converted into a traffic ticket citation, or a dangerous conditions report, or an infrastructure report, littering/rubbish/trash report, 131 for the violator and being stored on said cloud-3, 17, for delivery. The various people, AI algorithms forming replaceable, dynamic, on-demand, crowd-sourced nodes of the stewardship network.

Figure 16:
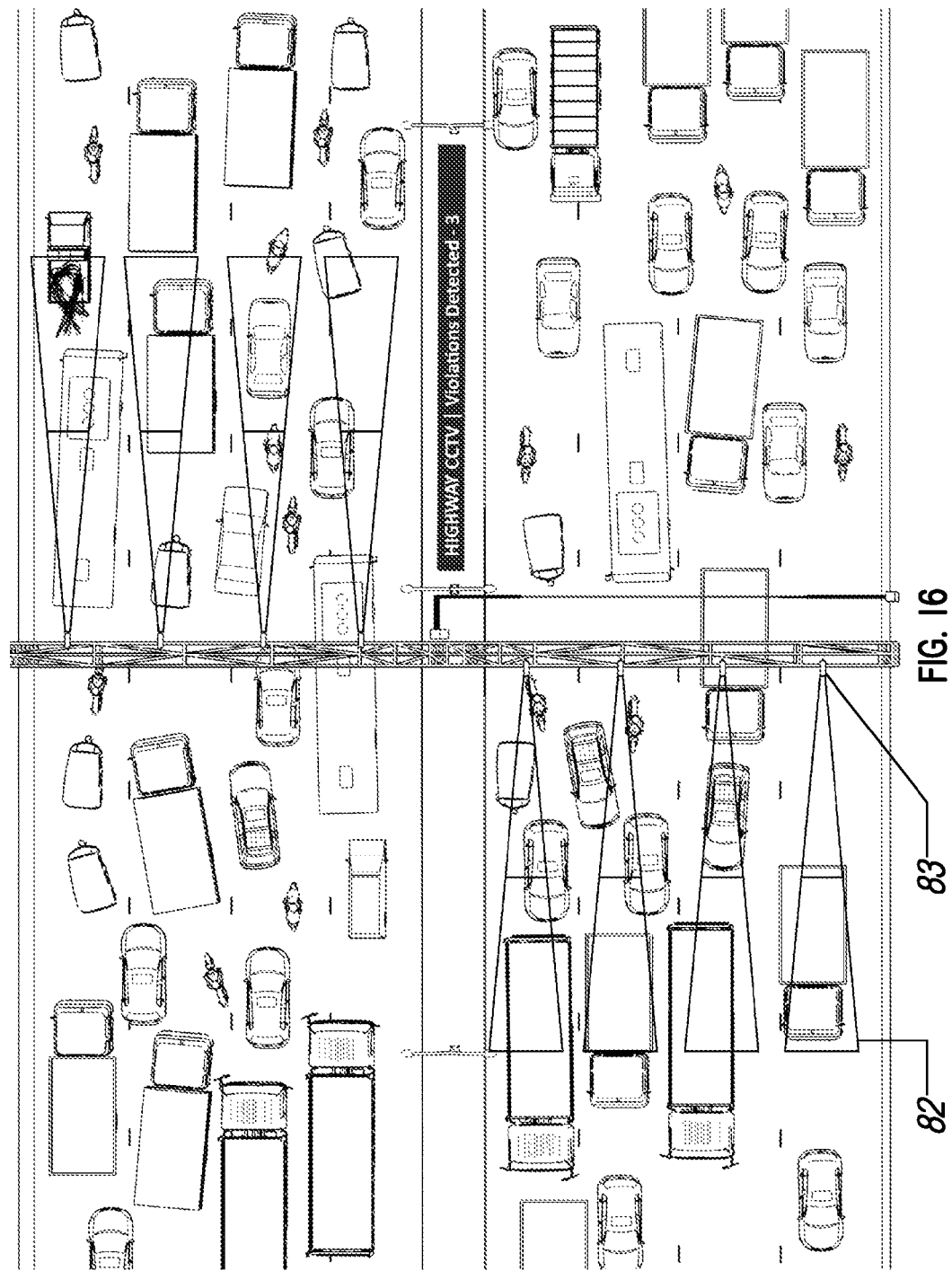
FIG. 16 showing a top view of violations being captured by IP or CCTV cameras and their field of view (FOV).
Figure 17:
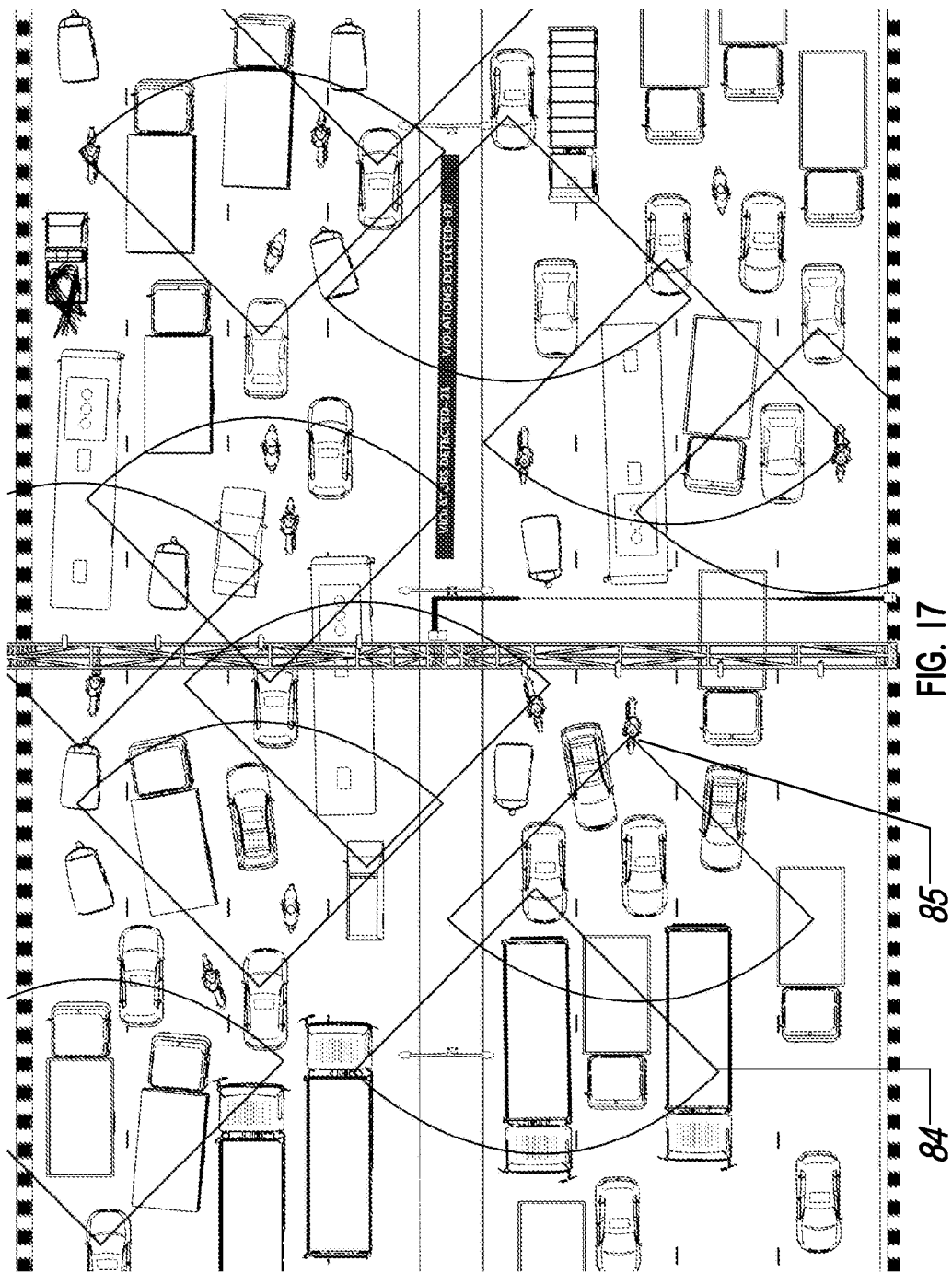
FIG. 17 showing a top view of violations being captured by the road steward application running on mobile cameras mounted in several vehicles, wherein each vehicle mobile camera has a range and field of view of capture, depending on the resolution of the cameras and the FOV of the lens on those cameras.

FIG. 16 showing a top view of violation instance recording on stationary recorder boundary views 82 on roadway infrastructure 83. Shows how limited static cameras can be in terms of capturing culprits on the roads, wherein violations not within the Field of View (FOV) of the cameras is not captured and in other cases drivers privy to the location of the cameras, start to follow the rules, whereas those outside the FOV continue to violate rules. For a given resolution on the image sensor, the FOV of the lens determines the distance at which licenses plates of the vehicles can be read. A small FOV increases FIG. 17 showing a top view of violation instance recording on vehicles 85 with recording boundaries 84. Showing that nearly all the roadway and nearly all the vehicles are within coverage of the mobiles cameras mounted on vehicles (they can be mounted inside, outside or other locations of the vehicle, including rear locations of the vehicle).

Figure 18:
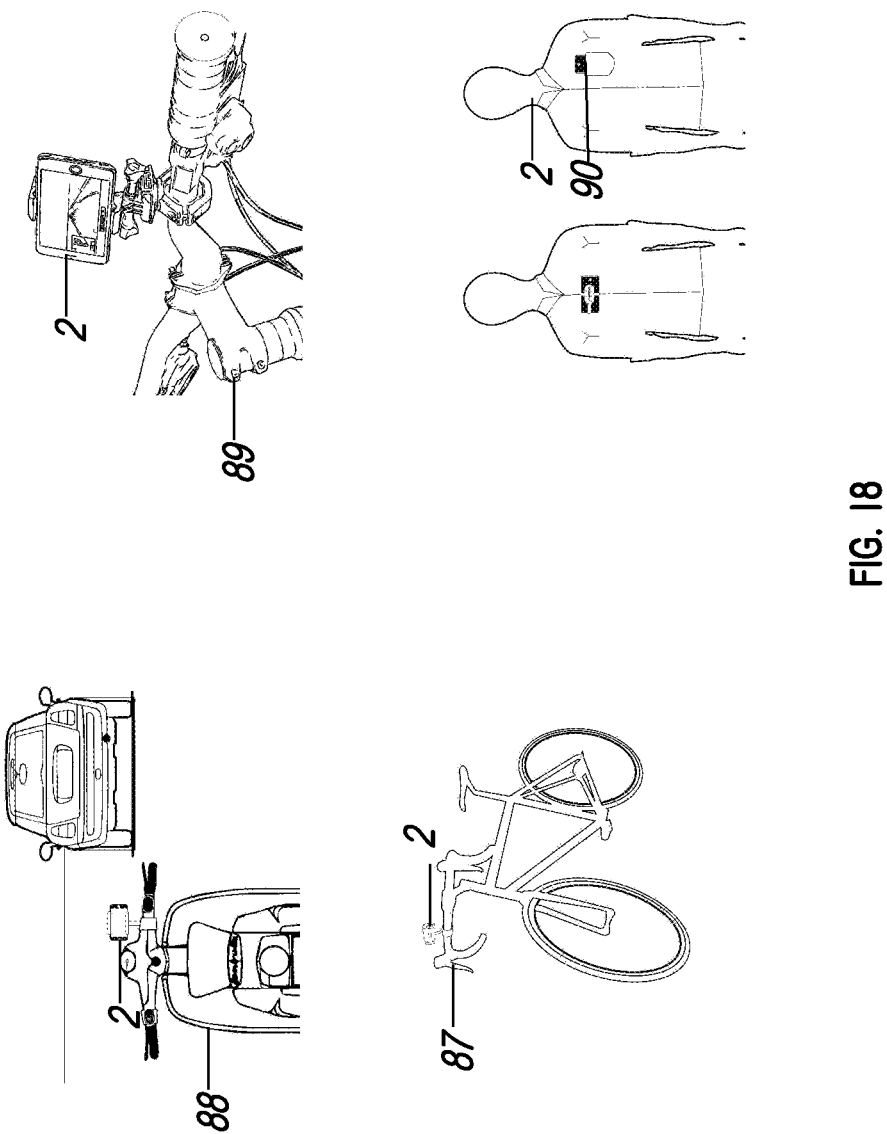
FIG. 18 showing perspective views of the invention on various mountings.

FIG. 18 showing perspective views of the invention within said mobile device 2 on a variety of mountings including bicycle 87, scooter 88, bicycle handle bar 89 and clothing pocket 90.

FIG. 19 also showing perspective views of the invention within said mobile device 2 on a variety of mountings including motorcycle 91, car dashboard 92, motorcycle 93 and drone 94.

Figure 20:
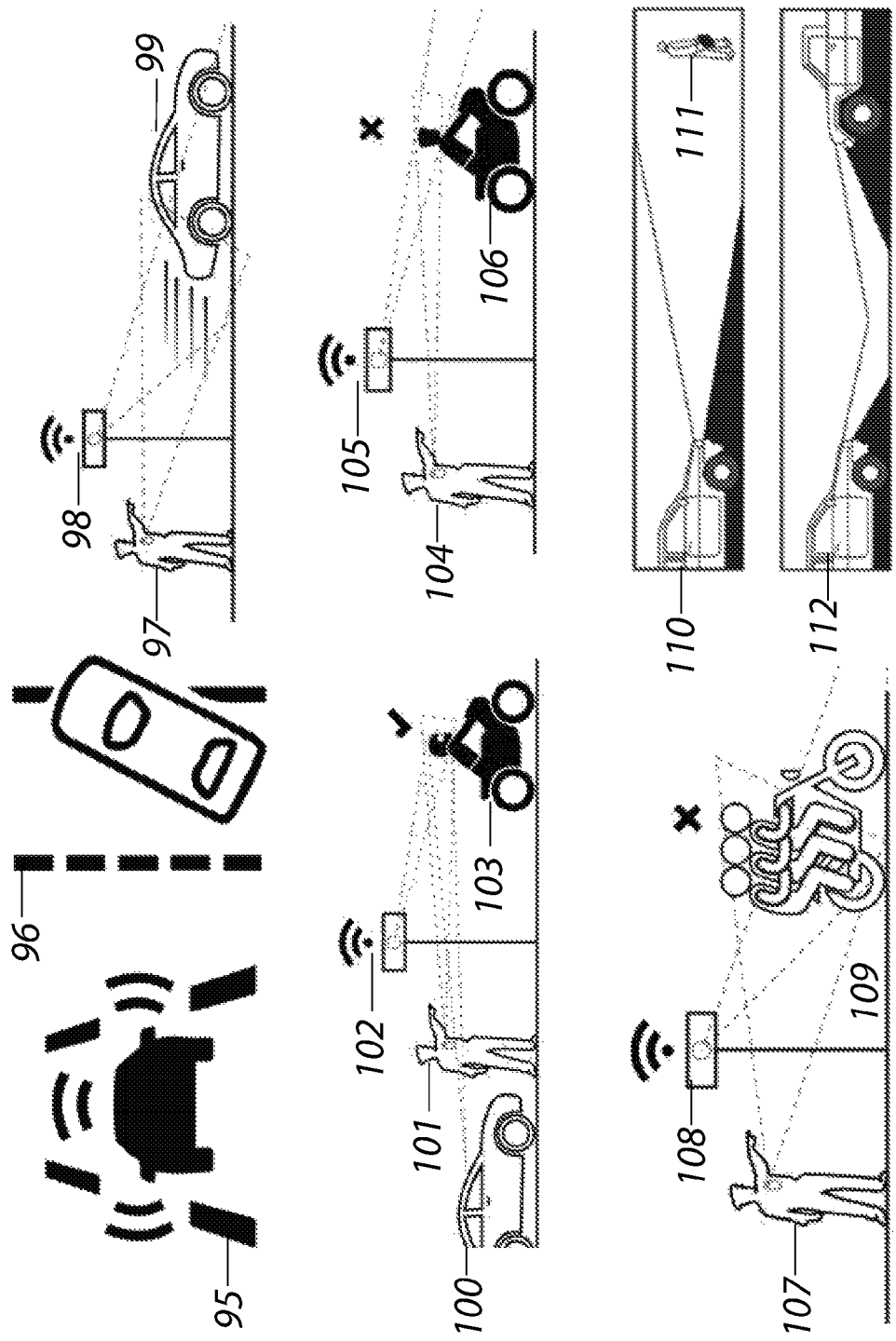
FIG. 20 showing some of the cases which can be trained using computer vision algorithms to detect violations of the traffic laws.

FIG. 20 shows driving following traffic laws and driving in violation of traffic laws. 95 shows the vehicle driving correctly and within the lanes designated on the road. 96 shows the violation of lanes while driving, wherein, either the vehicle is driving not adhering to one lane and instead driving in between lanes (on the diving lines) or the vehicle is shifting lanes without the use of an indicator light, both instances yield an automatic or manual trigger of a traffic violation. 97 shows a policeman wearing a body worn camera which is capturing the traffic violation of a vehicle driving on the road; same may also be detected by a static camera on a post 98. 99 shows violator driving faster than the designated speed limits on the road. The automatic detection algorithms and algorithms trained using Artificial Neural Networks (ANNs) are used to determine vehicles which follow the speed limits and those which exceed or fall short of the speed limits designated on the roads. Numerous data samples are collected to generate algorithms or to train the ANNs wherein the speeding of the violating vehicle is determined through computer vision techniques. 100 shows the vehicle carrying a mobile camera, 101 showing the policeman wearing a body worn camera, a post mounted camera and a vehicle with a rider wearing a helmet 102. The computer vision algorithms or the human operators determine that the rider is wearing a helmet and the rider is not cited as a violator. 103 shows the vehicle mounted camera, 104 shows the policeman wearing a camera, 105 shows the mounted camera on a post and 106 shows the rider on a bike not wearing a helmet. The computer vision algorithms determine that the rider is not wearing a helmet and is cited as a violator. 107 shows the policeman wearing a mobile phone camera, 108 is the camera mounted on a post and 109 are three riders on a bike; the condition is called tripling and is against the traffic laws in various states and countries. Computer vision algorithm or human specialists determine the violation and cite the vehicle as a violator of traffic laws. 110 is a vehicle driving at night in full beam while 111, a pedestrian is trying to cross the road at the designated crossing zone, driving in high beam and not dipper is a violation in many states and countries. 112 is a vehicle driving with dipper lights and is following the traffic laws. Computer vision algorithms and/or people determine the high beam and dipper condition of the vehicle and cite the appropriate traffic violation codes to the vehicle identified by its license plate, make, model, color etc.

Figure 21:
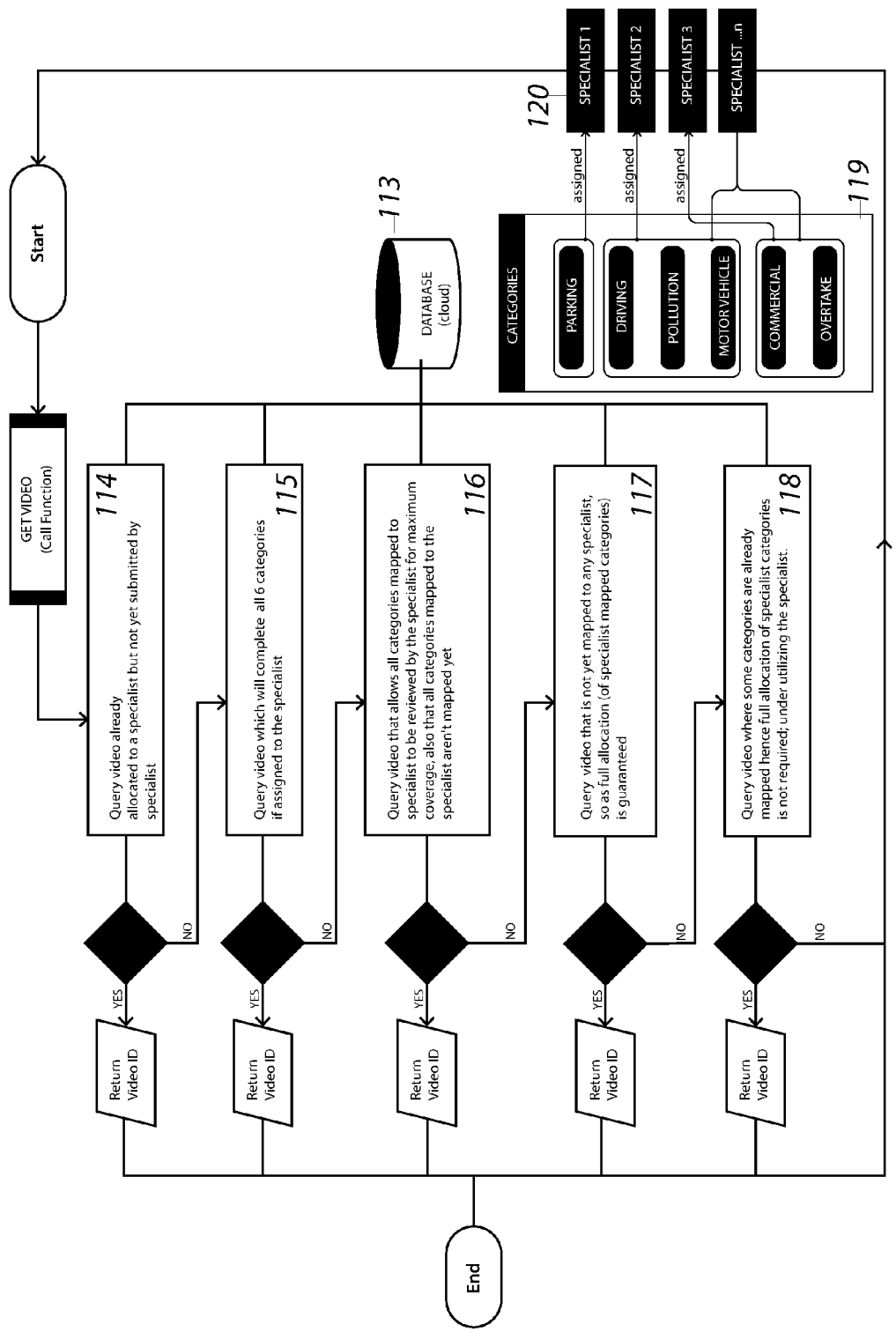
FIG. 21 showing an intelligent algorithm which assigns various videos to different specialists.

FIG. 21 shows a video allocation scheme, where in the Cloud Database 113, stores all the videos uploaded by various video recording devices on the field; the allocation logic tries to maximize video processing speed and most accurate processing of the video data at the maximum capacity of the specialists. Specialists 120 are assigned different categories to check including: Parking violations, driving violations, pollution, motor vehicle condition, commercial violations, overtaking violations etc. There can be multiple categories 119. One embodiment of the algorithm used uses a switch case (or condition matching), where the videos still in the cloud are allocated based on which Specialists are available and what categories have not yet been covered for the video. In 114, the video is fetched from the cloud which has already been assigned to a specialist but not yet processed by the Specialist. In 115, the video is fetched from the cloud database such that all the categories of the video are completed, i.e. the video may have only 3 out of the 6 categories reviewed so far but allocation to a specialist which has complimentary categories, would complete the video review comprehensively. 116 makes sure that the Specialist is used to their maximum capacity; which reduces the repeated viewing of the same video by multiple different Specialists. 117 allocates a video which is fresh and has no categories processed as yet but is allocated such that the Specialist can cover all of its assigned categories, thereby maximizing its own capacity. 118, is the last condition wherein the Specialist has some combination of categories, which are partially already processed for the said video by another Specialist, hence only a partial utilization of the Specialists' capacity is possible.

It is additionally noted and anticipated that although the device is shown in its most simple form, various components and aspects of the device may be differently shaped or slightly modified when forming the invention herein. As such those skilled in the art will appreciate the descriptions and depictions set forth in this disclosure or merely meant to portray examples of preferred modes within the overall scope and intent of the invention, and are not to be considered limiting in any manner. While all of the fundamental characteristics and features of the invention have been shown and described herein, with reference to particular embodiments thereof, a latitude of modification, various changes and substitutions are intended in the foregoing disclosure and it will be apparent that in some instances, some features of the invention may be employed without a corresponding use of other features without departing from the scope of the invention as set forth. It should also be understood that various substitutions, modifications, and variations may be made by those skilled in the art without departing from the spirit or scope of the invention.

What is claimed is:

1. A system for monitoring roadway activity comprising:
a camera, said camera comprising
a video image sensor;
a GPS sensor to determine Geo Coordinates of the video image sensor;
a memory electrically connected to the video image sensor, said memory retaining a series of images or video from the video image sensor for a period of time and then overwriting the series of images or video as new images or video is received; such memory buffer temporarily retains video and image data and recycles the memory space to conserve storage space on the camera, a processor electrically connected to the video image sensor, the GPS and to the memory; said processor saving a portion of the series of images to the memory when the processor detects that a user has indicated the command through a gesture sensor;

a video processing unit electrically connected to the processor and the memory, said video processing unit using an algorithm to determine from the portion of the series of images or video, if traffic violations are found on the portion of the series of images or video;

the gesture sensor for receiving a command from a user, said gesture sensor electrically connected to the processor and to the memory; and a network interface unit electrically connected to the processor and to the memory, said network interface unit transmitting a portion of the series of images or videos to a network when the processor detects that the user has indicated the command through the gesture sensor or when such command is triggered by the processor automatically or when such command is triggered through the network interface unit;

a specialized video processing server, comprising
a server network interface connected to the network, said server network interface moving the portion of the series of images to a server memory;
the server memory electrically connected to the server network interface;
a server processor electrically connected to the server memory and the server network interface; and
a video processing unit electrically connected to the server processor and the server memory said video processing unit using an algorithm to allocate the portion of the series of images to different specialists and auditors to determine if traffic violations are found on the portion of the series of images or video;

a networked reviewing panel, comprising
a network interface unit, which retrieves the series of images or video from the server over the network;
a display unit, to display the series of images or video to the different specialists and auditors;
a data input unit to allow users to submit their review of the series of images or video; such review data sent back to the server through the network;
a processor electrically connected to the display unit, network interface unit and data input unit.

2. The system of claim 1 wherein the gesture comprises a movement of a body part or a sound.

3. The system of claim 2 wherein the series of images or video are saved with at least their time, date and Geo Stamps at the time of recording.

4. The system of claim 3 wherein the camera is held or mounted at least on a living being or an artificial being selected from a robot, or a vehicle, or a drone, or a satellite, or an immobile object.

5. The system of claim 4 wherein the gesture sensor is at least a video image sensor or a microphone or a light sensor or an inertial motion sensor or a touch sensitive sensor or a button or a switch.

6. The system of claim 5 wherein the camera is a mobile camera.

7. The system of claim 6 wherein the system for monitoring roadway activity is a stewardship network comprised at a minimum of data collectors using a camera and data processors reviewing the video image data from the data collectors.

8. The system of claim 7 wherein the stewardship network can be flexible wherein members can be added or removed, or switch their roles dynamically.

9. The system of claim 8 wherein the stewardship network is on-demand, wherein members get to do their jobs whenever they like, at their time and location convenience.

10. A method for monitoring roadway activities, the method comprising:
recording roadway activities on a mobile video camera, said video camera retaining a series of images or video for a period of time and then overwriting the series of images or video as new images or video is received;
detecting a gesture from a user to preserve a portion of the series of images or video, said portion comprising a period before the gesture and a period after the gesture;
transmitting over a network the portion of the series of images or video to a specialized video processing server, said specialized video processing server configured with a network interface unit, a memory, a processing unit, a video display unit and a video processing unit;
interpreting the portion of the series of images or video by the video processing unit using an algorithm to allocate the portion of the series of images or video to different specialists and auditors;
reviewing the portion of the series of images or video by the different specialists and auditors with the aid of a networked reviewing panel, to determine if traffic violations are found on the portion of the series of images or video.

11. The method of claim 10 where the data collectors, specialists and auditors can be artificial intelligence algorithms, or persons.

12. The method of claim 11 wherein the algorithm to determine traffic violations on the portion of the series of images or video further comprises reading a license plate on an image of a vehicle, said image in the portion of the series of images or video.

13. The method of claim 12 where in the algorithm to determine traffic violations on the portion of the series of images or video is built using artificial neural networks.

14. The method of claim 13 further comprising rewarding data collectors, for a number of traffic violations identified from the portion of the series of images or video, with rewards based at least on volume of traffic violations collected.

15. The method of claim 14 further comprising rewarding specialists, for a number of traffic violations identified by the specialists from the portion of the series of images or video, with rewards based at least on volume of traffic violations identified.

16. The method of claim 15 further comprising rewarding auditors, for auditing the traffic violations found by the specialists, with rewards based at least on volume of traffic violations reviewed.

17. The method of claim 16 further comprising the rewarding of members of the stewardship network based on performance, where performance being a function of the volume of traffic violations identified.

18. The method of claim 17 wherein the other members of the stewardship network are also crowdsourced and crowdfunded, wherein citizens monitor other citizens and a system is funded by violators and serviced by users acting as at least data collectors, specialists or auditors.

19. The method of claim 18 further building a database of violations from the portion of the video and such database content be provided to an agency for further prosecution or delivery to violators through the medium of email, text messages, voicemails, physical mailed citations.

20. The method of claim 19 wherein the method is applied to other monitoring applications comprising at least data collectors, specialists and auditors.

* * * * *